United States Patent
Roe et al.

(10) Patent No.: US 9,989,004 B2
(45) Date of Patent: Jun. 5, 2018

(54) SYSTEM FOR DETERMINING PISTON PIN BORE WEAR

(71) Applicant: Caterpillar Inc., Peoria, IL (US)

(72) Inventors: Austin P. Roe, East Peoria, IL (US); Scott A. Thompson, Washington, IL (US); Anthony T. Petrou, Peoria, IL (US); Michael J. Campagna, Chillicothe, IL (US)

(73) Assignee: Caterpillar Inc., Deerfield, IL (US)

( * ) Notice: Subject to any disclaimer, the term of this patent is extended or adjusted under 35 U.S.C. 154(b) by 91 days.

(21) Appl. No.: 15/223,813

(22) Filed: Jul. 29, 2016

(65) Prior Publication Data
US 2018/0030913 A1   Feb. 1, 2018

(51) Int. Cl.
*F02D 17/00*    (2006.01)
*F02D 41/22*    (2006.01)

(52) U.S. Cl.
CPC .................................. *F02D 41/22* (2013.01)

(58) Field of Classification Search
CPC ......... F02D 2041/227; F02D 2041/228; F02D 41/22
See application file for complete search history.

(56) References Cited

U.S. PATENT DOCUMENTS

| | | | |
|---|---|---|---|
| 7,363,905 B2 * | 4/2008 | Schaller | ................... F01M 1/16 |
| | | | 123/196 S |
| 9,803,567 B2 * | 10/2017 | Bizub | ................... F02D 35/027 |
| 2015/0345421 A1 | 12/2015 | Gniesmer | |

* cited by examiner

*Primary Examiner* — Hung Q Nguyen
(74) *Attorney, Agent, or Firm* — James S. Bennin

(57) ABSTRACT

A machine may comprise a piston; a memory; and an electronic control module. The electronic control module may be configured to obtain information identifying a previous amount of wear of the piston pin bore and information identifying a wear limit; determine a base piston pin bore wear rate; calculate an effective piston pin bore wear rate based on the base piston pin bore wear rate; determine an amount of time between a current time and a time when the previous amount of wear of the piston pin bore was calculated; and calculate a current amount of wear of the piston pin bore based on the previous amount of wear, the amount of time, and the effective piston pin bore wear rate. The electronic control module may further be configured to calculate an amount of damage to the piston pin bore based on the current amount of wear and the wear limit.

20 Claims, 5 Drawing Sheets

SYSTEM FOR DETERMINING PISTON PIN BORE WEAR

TECHNICAL FIELD

The present disclosure relates generally to a system for determining piston damage and, more particularly, to a system for system for determining piston pin bore wear and damage.

BACKGROUND

An internal combustion engine may include an engine block defining a plurality of cylinder bores, a crankshaft rotatably supported in the engine block, and pistons connected to the crankshaft and configured to reciprocate within the cylinder bores. Typically, each piston may include a skirt pivotally connected to the crankshaft, and a crown connected to a distal end of the skirt. A combustion bowl may be formed on an end face of the crown to receive injected fuel, and annular grooves may be formed in an outer surface of the crown to receive associated rings. A cooling passage may be annularly formed inside the crown, between the bowl and the cooling passage, to circulate engine oil that may cool the bowl.

During operation of the engine, fuel and air is combusted inside the cylinder bore (and inside the bowl), to generate heat and pressure that is turned into mechanical work. Over a period of time, a piston pin bore of the piston (that may receive a piston pin) may wear out, thereby causing a change in a size of the piston pin bore. For example, the size of the piston pin bore may increase (e.g., a diameter and/or a circumference of the piston pin bore may increase). In this regard, an amount of space (e.g., a gap) between the piston pin bore (prior to any wear) and the piston pin is to be maintained to ensure proper operation of the piston. Accordingly, as the piston pin bore experiences wear, an excessive motion between the piston and the rod is created, which excessive motion may lead to seizure of the piston pin and scuffing of the piston.

U.S. Patent Application Publication No. 20150345421 (hereinafter the '421 publication) is directed to a piston of an internal combustion engine. The piston may include a piston crown with annular grooves, a combustion chamber bowl, and a piston skirt with a pin bore to receive a pin. However, the '421 publication does not disclose monitoring wear of a piston pin bore.

SUMMARY

In some embodiments, a control system, for monitoring an amount of wear of a piston pin bore of a piston of an engine, may comprise a memory configured to store piston pin bore wear information; and an electronic control module. The electronic control module may be configured to obtain, from the piston pin bore wear information stored in the memory, information identifying a previous amount of wear of the piston pin bore and information identifying a wear limit; determine a base piston pin bore wear rate; calculate an effective piston pin bore wear rate based on the base piston pin bore wear rate; determine an amount of time between a current time and a time when the previous amount of wear of the piston pin bore was calculated; calculate a current amount of wear of the piston pin bore based on the previous amount of wear of the piston pin bore, the amount of time, and the effective piston pin bore wear rate; calculate an amount of damage to the piston pin bore based on the current amount of wear of the piston pin bore and the wear limit; and take a remedial action based on the amount of damage to the piston pin bore.

In some embodiments, a method, for monitoring an amount of wear of a piston pin bore of a piston of an engine, may comprise obtaining, by an electronic control module and from piston pin bore wear information stored in a memory, information identifying a previous amount of wear of the piston pin bore and information identifying a wear limit; determining, by the electronic control module, a base piston pin bore wear rate; calculating, by the electronic control module, an effective piston pin bore wear rate based on the base piston pin bore wear rate; determining, by the electronic control module, an amount of time between a current time and a time when the previous amount of wear of the piston pin bore was calculated; determining, by the electronic control module an amount of time between a current time and the time when the previous amount of wear of the piston pin bore was calculated; calculating, by the electronic control module, a current amount of wear of the piston pin bore based on the previous amount of wear of the piston pin bore, the amount of time, and the effective piston pin bore wear rate; calculating, by the electronic control module, an amount of damage to the piston pin bore based on the current amount of wear of the piston pin bore and the wear limit; and taking, by the electronic control module, a remedial action based on the amount of damage to the piston pin bore.

In some embodiments, a machine may comprise a piston; a memory configured to store piston pin bore wear information, the piston pin bore wear information including information identifying a previous amount of wear of the piston pin bore; and an electronic control module. The electronic control module may be configured to obtain, from the piston pin bore wear information stored in the memory, information identifying a previous amount of wear of the piston pin bore and information identifying a wear limit; determine a base piston pin bore wear rate; calculate an effective piston pin bore wear rate based on the base piston pin bore wear rate; determine an amount of time between a current time and a time when the previous amount of wear of the piston pin bore was calculated; calculate a current amount of wear of the piston pin bore based on the previous amount of wear of the piston pin bore, the amount of time, and the effective piston pin bore wear rate; calculate an amount of damage to the piston pin bore based on the current amount of wear of the piston pin bore and the wear limit; and take a remedial action based on the amount of damage to the piston pin bore.

DETAILED DESCRIPTION

Figure 1:
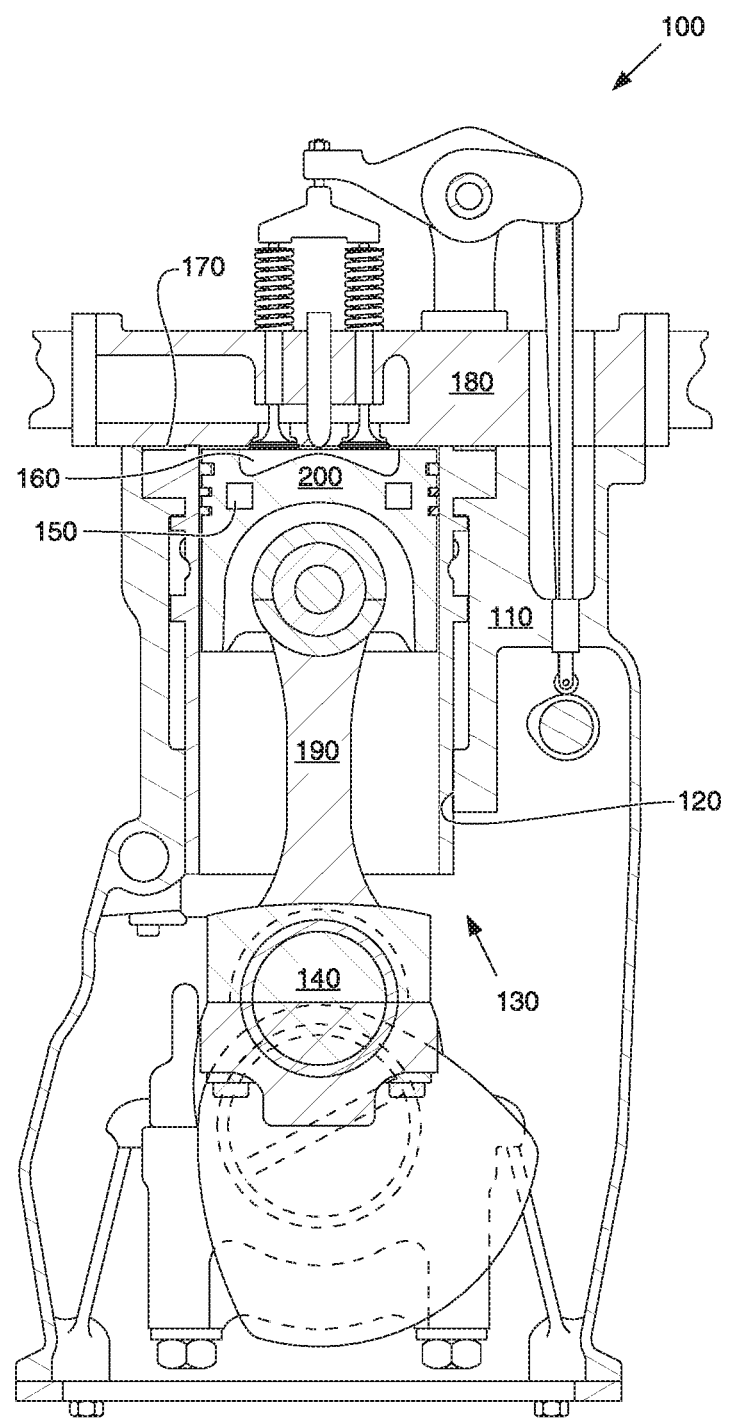
FIG. 1 is a cross-sectional view of an engine according to an embodiment of the present disclosure.

FIG. 1 is a cross-sectional view of an exemplary internal combustion engine 100 (or engine 100) according to an embodiment of the present disclosure. In some implementations, engine 100 may include a block 110 (or engine block 110) defining one or more bores 120 (or cylinder bores 12). A hollow liner 130 (or cylinder liner 130) may be disposed within each of the one or more bores 120, and a head 180 (or cylinder head 180) may be connected (e.g., by way of a gasket 170) to block 110 to close off an end of a bore 120, of the one or more bores 120, and liner 130. A piston 200 may be slidably disposed within liner 130, and piston 200 together with liner 130 and head 180 may define a combustion chamber 160. Piston 200 may include an annular cooling passage 150. Piston 200 and annular cooling passage 150 are described in more detailed below. In some implementations, engine 100 may include one or more combustion chambers 160 and the one or more combustion chambers 160 may be disposed in an "in-line" configuration, in a "V" configuration, in an opposing-piston configuration, or in any other suitable configuration.

In some implementations, piston 200 may be configured to reciprocate within liner 130 between a top-dead-center (TDC) position and a bottom-dead-center (BDC) position during a combustion event occurring with chamber 160. More particularly, piston 200 may be pivotally connected to a crankshaft 140 by way of a connecting rod 190 (or rod 190), so that a sliding motion of each piston 200 within cylinder liner 130 results in a rotation of crankshaft 140. Similarly, a rotation of crankshaft 140 may result in a sliding motion of piston 200. In a four-stroke engine, piston 200 may move through four full strokes to complete a combustion cycle of about 720° of crankshaft rotation. These four strokes include an intake stroke (TDC to BDC), a compression stroke (BDC to TDC), a power stroke (TDC to BDC), and an exhaust stroke (BDC to TDC). Fuel (e.g., diesel fuel, gasoline, gaseous fuel, etc.) may be injected into combustion chamber 160 during the intake stroke. The fuel may be mixed with air and ignited during the compression stroke. Heat and pressure resulting from the fuel/air ignition may then be converted to useful mechanical power during the ensuing power stroke. Residual gases may be discharged from combustion chamber 160 during the exhaust stroke.

The number of components (of engine 100) shown in FIG. 1 is provided for explanatory purposes. In practice, there may additional components, fewer components, different components, or differently arranged components than those shown in FIG. 1.

Figure 2:
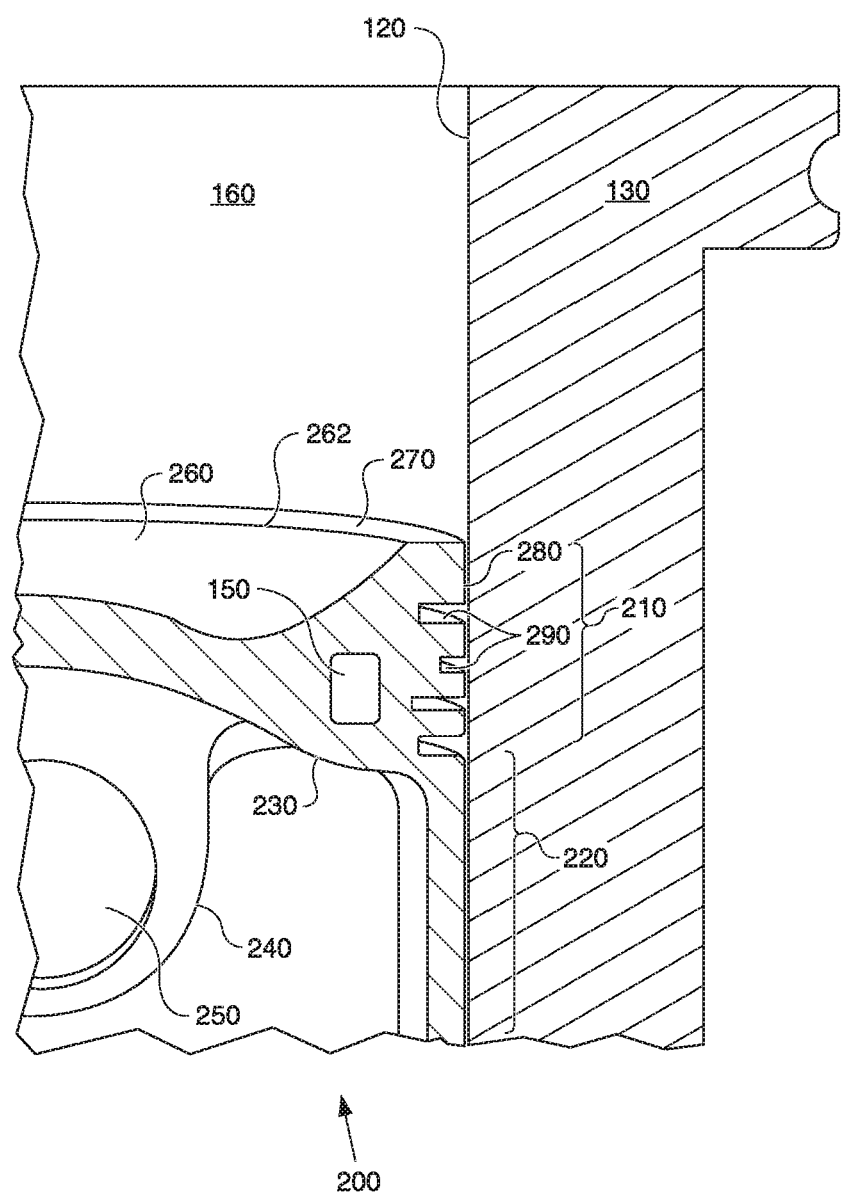
FIG. 2 is a cross-sectional view of a piston of the engine of FIG. 1.

FIG. 2 is a cross-sectional view of piston 200 of engine 100 of FIG. 1. In some implementations, piston 200 may generally consist of an integral crown 210 (or crown 210), a skirt 220, and undercrown 230. Skirt 220 be generally tubular (i.e., hollow and cylindrical), with a bearing support 240 (or support 240) formed therein. Support 240 may be configured to receive a wrist pin that pivotally connects piston 200 to rod 190 (referring to FIG. 1). Support 240 may define a pin bore 250. Piston pin bore (or piston bore) 250 may receive a piston pin (not shown). Crown 210 may be formed at end of piston 200 opposite support 240, and may include an end face 270 and an annular side surface 280. Undercrown 230 may correspond to an area under crown 210. One or more ring grooves 290 may be cut into annular side surface 280 and configured to receive corresponding oil rings (not shown), compression rings (not shown), or another type of piston ring known in the art. A bowl 260 may be recessed within end face 270, and a rim 262 (bowl rim 262) may be located at an intersection of bowl 260 and end face 270. An annular cooling passage 150 may be formed in crown 210 between bowl 260 and grooves 290. The circulation of engine oil or another coolant through passage 150 during operation of engine 100 may reduce a temperature of crown 210. In some implementations, annular cooling passage 150 may define (or may correspond to) an oil gallery in which the engine oil may reside. With this configuration, the engine oil may function as a heat sink, causing combustion heat from inside bowl 260 to pass radially outward and downward in a direction toward annular cooling passage 150.

The number of components shown in FIG. 2 is provided for explanatory purposes. In practice, there may additional components, fewer components, different components, or differently arranged components than those shown in FIG. 2.

Figure 3:
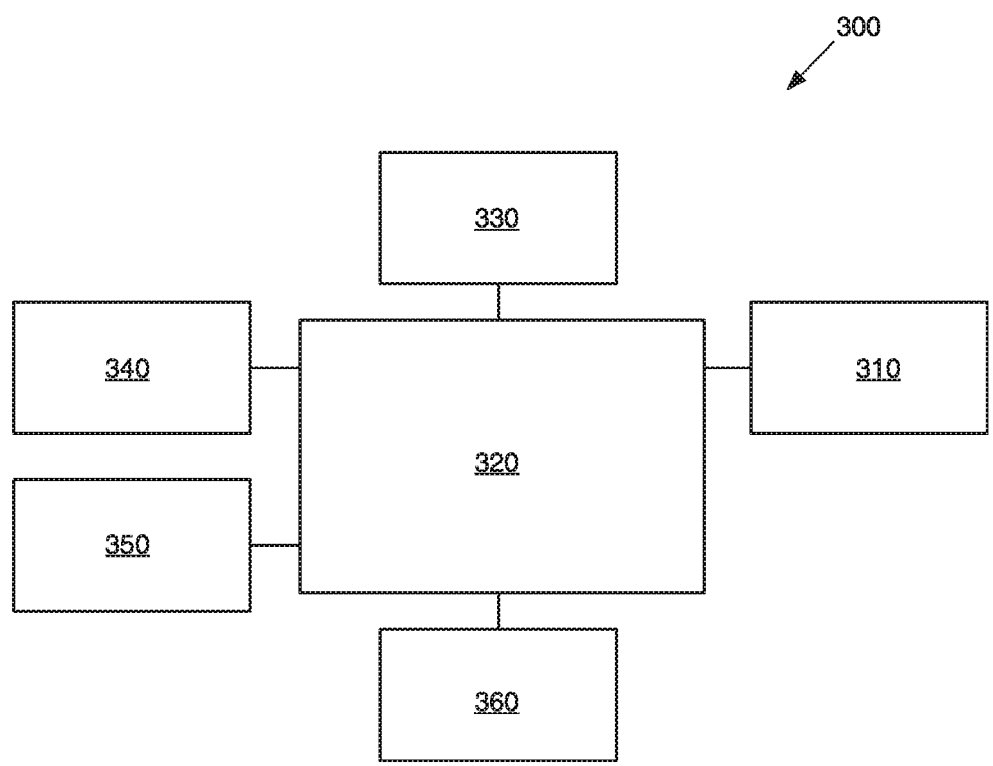
FIG. 3 is a diagram of example components of a system that may be used to monitor and determine wear of a piston bore of the piston of FIG. 2 to determine damage to the piston.

FIG. 3 is a diagram of example components of a system 300 that may be used to monitor and determine wear of piston pin bore 250 to determine damage to piston 200 of FIG. 2. In some embodiments, the example components may include a memory 310, an electronic control module (ECM) 320, a display 330, a sensor 340, an input device 350, and a communication interface 360. The example components of system 300 may be implemented using hardware, software, and/or a combination of hardware and software. In some implementations, the example components of system 300 may be interconnected using wired connections, wireless connections, and/or a combination of wired connections and wireless connections.

In some implementations, engine 100 and one or more of the example components of system 300 may be included in a machine. For example, engine 100, memory 310, ECM 320, display 330, sensor 340, input device 350 and/or communication interface 360 may be located in the machine. In some implementations, one or more of the example components of system 300 may be included in a back office. For example, memory 310, ECM 320, display 330, sensor 340, input device 350 and/or communication interface 360 may be located in the back office while engine 100 and sensor 340 may be located in the machine.

Memory 310 may include a random access memory ("RAM"), a read only memory ("ROM"), and/or another type of dynamic or static storage device (e.g., a flash, magnetic, or optical memory) that stores information and/or instructions for use by the example components, such as ECM 320, to monitor and determine wear of piston pin bore 250 to determine damage to piston 200. Additionally, or alternatively, memory 310 may include non-transitory computer-readable medium or memory, such as a disc drive, flash drive, optical memory, read-only memory (ROM), or the like. In some implementations, with respect to the information and/or the instructions for use by the example components, memory 310 may store information (e.g., obtained in real-time or near real-time by sensor 340) regarding temperature(s) of engine 100, temperature(s) of piston 200, temperature(s) of components of piston 200 (e.g., temperature(s) of crown 210, rim 262, undercrown 230, etc.). Additionally, or alternatively, memory 310 may store information regarding one or more models as described in U.S. patent application Ser. No. 15/087,439 (incorporated herein by reference in its entirety). For example, the one or more models may include a combustion model, a heat flux model, a thermal model, and/or a damage model. In some implementations, memory 310 may store the information and/or the instructions in one or more data structures, such as one or more databases, tables, lists, trees, etc.

ECM 320 (or controller 320) may include any type of device or any type of component that may interpret and/or execute the information and/or the instructions stored within memory 310 to perform one or more functions. For example, ECM 320 may use the information and/or execute the instructions to monitor and determine wear of piston pin bore 250 to determine damage to piston 200 and/or components of piston 200. In some implementations, ECM 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.), and/or any other hardware and/or software.

In some embodiments, ECM 320 may obtain information from the example components and use the information to monitor and determine wear of piston pin bore 250 to determine damage to piston 200. For example, ECM 320 may obtain information from sensor 340 and/or from memory 310 and use the information to monitor and determine wear of piston pin bore 250 to determine damage to piston 200. In some implementations, ECM 320 may transmit, via a network (not shown), information regarding the wear of piston pin bore 250 and/or information regarding the damage to piston 200 to another device (e.g., at a back office system (not shown)) and/or another machine (not shown)). For example, ECM 320 may cause communication interface 360 to transmit the information regarding the wear of piston pin bore 250 and/or information regarding the damage to piston 200.

Display 330 may include any type of device or any type of component that may display information. For example, display 330 may display information regarding the wear of piston pin bore 250 and/or information regarding the damage to piston 200. In some implementations, display 330 may be a liquid crystal display (LCD), a light-emitting diode (LED) display, an organic light-emitting diode (OLED) display, and/or the like.

Sensor 340 may include any type of device(s) or any type of component(s) that may sense (or detect) information regarding engine 100 and/or piston 200. In some implementations, sensor 340 may located at various portions of engine 100 and/or piston 200 to sense (or detect) information regarding engine 100 and/or piston 200. For example, the information regarding engine 100 and/or piston 200 may include a speed of engine 100 (e.g., a rotational speed of crankshaft 140), a mass of engine 100 (e.g., component(s) of engine 100), an inertia load (e.g., based on the speed and/or the mass), a quantity of fuel being injected into combustion chamber 160 during each combustion cycle, a timing of the fuel being injected, a pressure of the fuel being injected, a flow rate of air entering combustion chamber 160 during each combustion cycle, a temperature of the air, a pressure of the air, a temperature of the engine oil in passage 150 (e.g., the oil gallery) and/or other fluid of engine 100, a temperature of other components of engine 100 and/or piston 200 (e.g., crown 210, rim 262, etc.), a cylinder pressure, a cylinder pressure load, and/or the like. In some implementations, sensor 340 may include a pressure sensor (e.g., to detect machine strut pressures), a force gauge, a load cell, a piezoelectric sensor, and/or the like.

Input device 350 may include a component that permits a user to input information to one or more other components of the example components of system 300. For example, the information, input by the user, may include a preference (of the user) for a frequency for monitoring and/or for determining the wear of piston pin bore 250 and the damage to piston 200. Additionally, or alternatively, the information, input by the user, may include a manner (e.g., algorithm(s), parameters(s), etc.) for monitoring and/or determining the wear of piston pin bore 250 and/or the damage to piston 200. In some embodiments, input device 360 may include a keyboard, a keypad, a mouse, a button, a camera, a microphone, a switch, a touch screen display, and/or the like.

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

The number of components shown in FIG. 3 is provided for explanatory purposes. In practice, there may additional components, fewer components, different components, or differently arranged components than those shown in FIG. 3.

Figure 4:
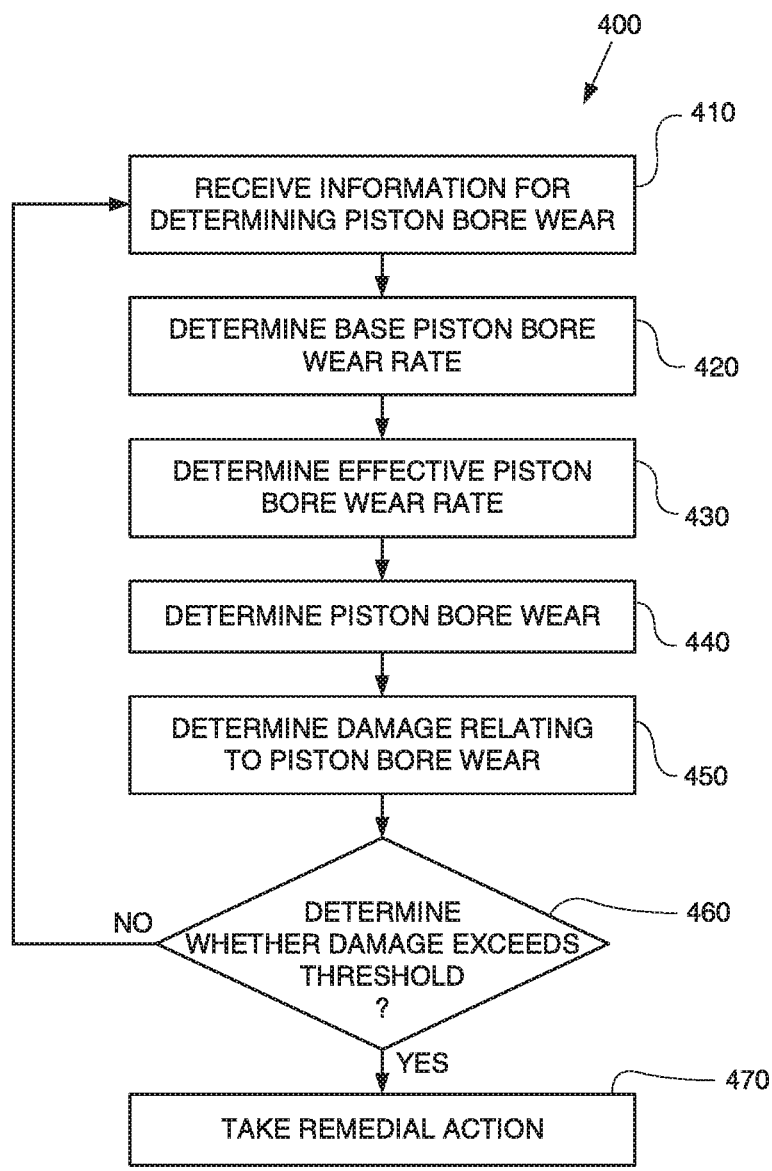
FIG. 4 is a flow chart of an example process performed by the system of FIG. 3 for monitoring and determining wear of the piston bore of the piston of FIG. 2 to determine damage to the piston.

FIG. 4 is a flow chart of an example process 400 performed by the system of FIG. 3 for monitoring and determining wear of the piston bore of the piston of FIG. 2 to determine damage to the piston. In some implementations, one or more process blocks of process 400 may be performed by ECM 320. For example, ECM 320 may perform one or more process blocks of process 400 automatically (e.g., without intervention/input from a user). In some implementations, one or more process blocks of FIG. 4 may be performed by another device or a group of devices separate from or including ECM 320, such as device(s) at a remote location (e.g., a back office).

As shown in FIG. 4, process 400 may include receiving information for determining wear of piston pin bore 250 (block 410). For example, ECM 320 may receive piston pin bore wear information that ECM 320 may use with respect to determining the wear of piston pin bore 250. In some implementations, the piston pin bore wear information may be stored in memory 310 and ECM 320 may obtain the piston pin bore wear information from memory 310. Additionally, or alternatively, the piston pin bore wear information may be stored in another memory (similar to or different than memory 310) and ECM 320 may obtain the piston pin bore wear information from memory 310. Additionally, or alternatively, the piston pin bore wear information may be submitted by a user using input device 350 and ECM 320 may receive the piston pin bore wear information submitted by the user. Additionally, or alternatively, the piston pin bore wear information may be obtained by sensor 340 and ECM 320 may obtain the piston pin bore wear information from sensor 340.

In some implementations, the piston pin bore wear information may include an indication that wear is to be determined for piston 200. For example, the indication may submitted by a user using input device 350 and ECM 320 may receive the indication. Additionally, or alternatively, ECM 320 may obtain information from memory 310 and may identify the indication based on the information obtained from memory 310. In some implementations, the information from memory 310 may include a time interval for ECM 320 to determine the wear of piston pin bore. For example, the time interval may indicate that ECM 320 is to determine the wear of piston pin bore 250 at a frequency 0.01 Hz to 100 Hz. The time interval may be expressed in other units of time measurement. For example, the time interval may indicate that ECM 320 is to determine the wear of piston pin bore 250 every second, every minute, every hour, and/or the like.

Additionally, or alternatively, the piston pin bore wear information may include information identifying a wear limit for piston pin bores. In some implementations, ECM 320 may use the wear limit to determine an amount of damage to piston pin bores based on the wear of the piston pin bores. For example, ECM 320 may determine a level of damage to piston pin bore 250 based on the wear of piston pin bore with respect to the wear limit (as will be explained in more detail below). In some implementations, the wear limit may be different for each piston pin bore (e.g., based on physical parameters of piston pin bore 250, such as geometry, shapes, sizes, contours, material properties such as coefficients of heat transfer, etc.).

Additionally, or alternatively, the piston pin bore wear information may include piston and/or engine information regarding the components of piston 200 and/or the components of engine 100. For example, the piston and/or engine information may include physical parameters (e.g., geometry, shapes, sizes, contours, material properties such as coefficients of heat transfer, etc.) of the components, relationships (e.g., a compression ratio, a bore stroke, valve timings, etc.) between the components, and/or the like. Additionally, or alternatively, the piston and/or engine information may include information regarding various fluids (fuel, lubrication, coolant, engine oil, air, etc.) of piston 200 and/or engine 100. For example, the information regarding various fluids may include a makeup of the fluids, a concentration of the fluids, a quality of the fluids, other characteristics of the fluids, and/or the like.

Additionally, or alternatively, the piston pin bore wear information may include the information regarding one or more of the models (a combustion model, a heat flux model, a thermal model, and/or a damage model) as described in U.S. patent application Ser. No. 15/087,439 (incorporated herein by reference in its entirety). Additionally, or alternatively, the piston pin bore wear information may include the information regarding engine 100 and/or piston 200 described above with respect to sensor 340.

As further show in FIG. 4, process 400 may include determining a base piston pin bore wear rate (block 420). For example, ECM 320 may calculate the piston pin bore wear rate of piston pin bore 250 based on the piston pin bore wear information. For instance, ECM 320 may determine the piston pin bore wear rate of piston pin bore 250 based on the speed of engine 100, the mass of engine 100, and the cylinder pressure (e.g., obtained by sensor 340). In some implementations, in order to determine the base piston pin bore wear rate, ECM 320 may calculate a piston pin bore unit load based on the cylinder pressure, the mass of engine 100, and the speed of engine 100. For example, ECM 320 may calculate the piston pin bore unit load as a mathematical combination based on the cylinder pressure, the mass of engine 100, and the speed of engine 100. For instance, ECM 320 may calculate the piston pin bore unit load using the following equation:

$$L_{PB} = L_{CP} + L_i \quad \text{EQ. 1}$$

wherein:
$L_{PB}$ is the piston pin bore unit load,
$L_{CP}$ is a cylinder pressure load (e.g., determined based on the cylinder pressure), and
$L_i$ is the inertia load (e.g., determined based on the speed and the mass).

In some implementations, ECM 320 may determine the cylinder pressure load based on the cylinder pressure and may determine the inertia load based on the speed and the mass). Additionally, or alternatively, ECM 320 may obtain the cylinder pressure load and the inertia load from sensor 340. Based on the piston pin bore unit load, ECM 320 may determine the base piston pin bore wear rate.

In some implementations, ECM 320 may determine a relationship between piston bore unit loads and base piston pin bore wear rates. In some implementations, the relationship between the piston bore unit loads and the base piston pin bore wear rates may be based on one or more experiments, field studies, analyses, and/or the like. For example, results of the one or more analyses, experiments, field study, and/or the like may identify a corresponding base piston pin bore wear rate for each piston bore unit load. For instance, the results may be illustrated as a graph (or a chart) that identifies a corresponding base piston pin bore wear rate for each piston bore unit load. Accordingly, based on the piston bore unit load and using the relationship between the piston bore unit loads and the base piston pin bore wear rates, ECM 320 may determine the base piston pin bore wear rate corresponding to the piston bore unit load.

In some implementations, the base piston pin bore wear rate may be measured (or expressed) in micro meters per hour (μm/h). Additionally, or alternatively, other units of measurement may be used to measure (or express) the base piston pin bore wear rate. In some implementations, the base piston pin bore wear rate may vary over period of time based on the wear of piston pin bore 250. For example, the base piston pin bore wear rate may decrease as piston pin bore 250 is worn. Accordingly, ECM 320 may re-determine the piston pin bore wear rate each time ECM 320 determines the wear of piston pin bore 250. In some implementations, base piston pin bore wear rates may vary based on physical characteristics of piston pin bore (e.g., properties, geometry, shape, etc.).

As further show in FIG. 4, process 400 may include determining an effective piston pin bore wear rate (block 450). For example, ECM 320 may calculate an effective piston pin bore wear rate based on the base piston pin bore wear rate (calculated in block 420) and one or more factors, such as a wear rate modifier. In some implementations, the wear rate modifier may be based on an amount of time since start up of engine 100, a start and a stop frequency of engine 100, a load ramp rate (e.g., information regarding a load of engine 100 upon start up), and/or the like. Additionally, or alternatively, the wear rate modifier may be based on oil temperature, oil degradation/quality, amount of fluid reaching a pin joint of piston 200, and/or the like. In some implementations, information regarding the amount of time since start up of engine 100, the start and the stop frequency of engine 100, the load ramp rate, the oil temperature, the oil degradation/quality and/or the amount of fluid reaching the pin joint may be included in the information regarding engine 100 and/or piston 200 obtained by sensor 340. In some implementations, ECM 320 may determine the wear rate modifier. In some implementations, ECM 320 may obtain the wear rate modifier from the piston pin bore wear information.

In some implementations, ECM 320 may calculate the effective piston pin bore wear rate based on a mathematical combination of the base piston pin bore wear rate and the wear rate modifier. For example, ECM 320 may calculate the effective piston pin bore wear rate using the following equation:

$$\dot{X}(i)' = A * \dot{X}(i) \qquad \text{EQ. 2}$$

wherein:
- $\dot{X}'$ is the effective piston pin bore wear rate,
- i is the current iteration,
- A is the wear modifier, and
- $\dot{X}$ is the base piston pin bore wear rate.

In some implementations, ECM 320 may update the piston pin bore wear information (stored in memory 310 and/or another memory) based on the effective piston pin bore wear rate. For example, ECM 320 may update a previously calculate effective piston pin bore wear rate with the effective piston pin bore wear rate.

Figure 5:
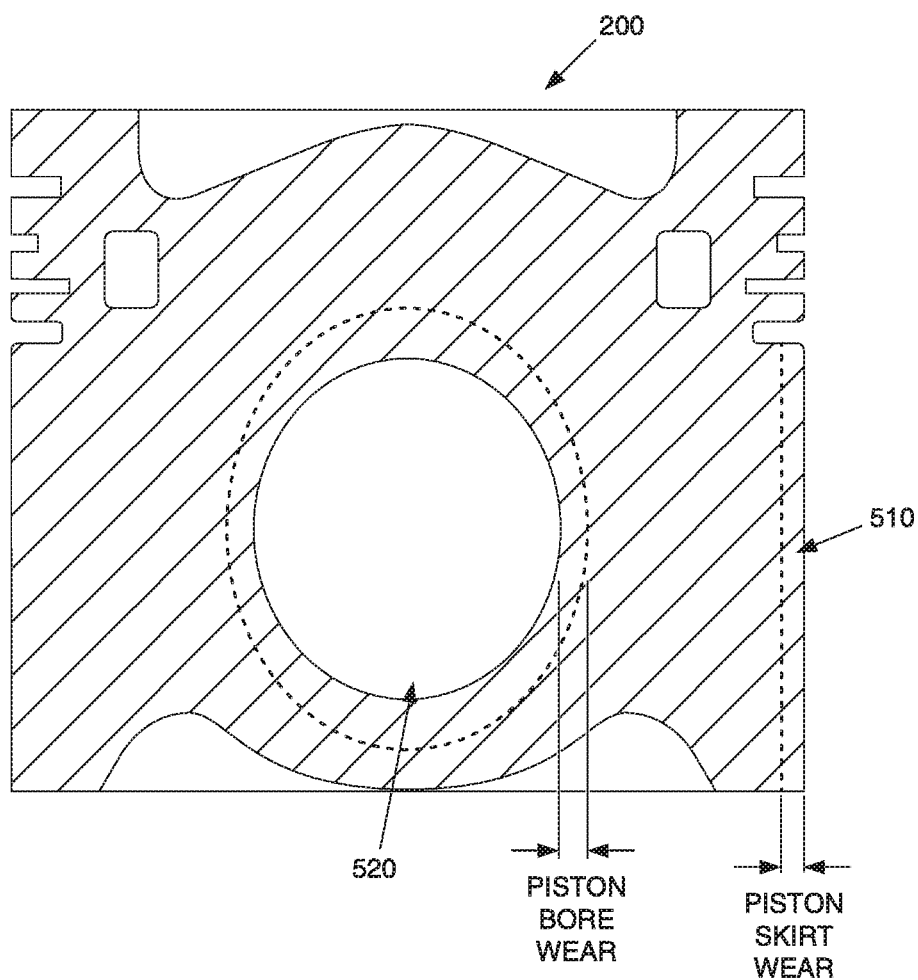
FIG. 5 is a cross-sectional view of the piston of FIG. 2.

As further show in FIG. 4, process 400 may include determining piston bore wear (block 440). For example, ECM 320 may calculate the wear of piston pin bore 250 based on the effective piston pin bore wear rate (determined in block 430). FIG. 5 illustrates an example wear of piston pin bore 250. In this regard, piston bore wear may typically occur in the cylinder axially direction or slightly offset of axial due to the up and down motion of the piston, and the angle of the connecting rod. Accordingly, the wear may form an ellipse shape. In this regard, the present disclosure is directed to determining is the max wear direction, or direction that may lead to a seizure.

Referring back to FIG. 4, in some implementations, ECM 320 may calculate the wear of piston pin bore 250 based on a mathematical combination of the effective piston pin bore wear rate and one or more other factors. For example, ECM 320 may calculate the wear of piston pin bore 250 using the following equation:

$$X(i) = X(i-1) + \dot{X}(i)' * \Delta t \qquad \text{EQ. 3}$$

wherein:
- i is the current iteration (of the calculation of the wear of piston pin bore 250),
- X(i) is the wear of piston pin bore 250 (or the current wear of piston pin bore 250),
- X(i−1) is the previous wear of piston pin bore 250, and
- Δt is the amount of time between a current time and a time (prior to the current time) when the previous wear of piston pin bore 250 was calculated (Δt may be based on or correspond to the time interval for ECM 320 to determine the wear of piston pin bore 250).

In some implementations, the previous wear of piston pin bore 250 may refer to an amount of wear of piston pin bore 250 up until the time (prior to the current time) when the previous wear of piston pin bore 250 was calculated. In this regard, the piston pin bore 250 (or the current piston pin bore 250) may refer to an additional amount of wear of piston pin bore 250 up until the current time. In some implementations, information identifying the previous wear of piston pin bore 250 and information identifying the time when the previous wear of piston pin bore 250 was calculated may be included in the piston pin bore wear information. In this regard, ECM 320 may determine the current time as a time to calculate the wear of piston pin bore 250 based on the time interval and the time when the previous amount of wear of the piston pin bore was calculated. For example, ECM 320 may determine that the time interval has elapsed since the time when the previous amount of wear of the piston pin bore was calculated and, accordingly, determine that the wear of piston pin bore 250 is to be calculated at the current time. Additionally, or alternatively, ECM 320 may determine Δt based on the time interval and the time when the previous wear of piston pin bore 250 was calculated. Additionally, or alternatively, ECM 320 may determine Δt based on the current time and the time when the previous wear of piston pin bore 250 was calculated.

In some implementations, the wear of piston pin bore 250 may be measured (or expressed) in micro meters (μm). Additionally, or alternatively, other units of measurement may be used to measure (or express) the wear of piston pin bore 250. In some implementations, ECM 320 may update the piston pin bore wear information based on the wear of piston pin bore 250 (or the current wear of piston pin bore 250). For example, ECM 320 may update the previous wear of piston pin bore 250 with the current wear of piston pin bore 250. Accordingly, the current wear of piston pin bore 250, included in the piston pin bore wear information (stored in memory 310 and/or another memory), may become the previous wear of piston pin bore 250.

As further show in FIG. 4, process 400 may include determining damage relating to the wear of piston pin bore 250 (block 450). For example, ECM 320 may calculate an amount of damage to piston pin bore 250 based on the wear of piston pin bore 250 (determined in block 440) and the wear limit (e.g., included in the piston pin bore wear information). In some implementations, ECM 320 may determine the amount of damage to piston pin bore 250 as a mathematical combination of the wear of piston pin bore 250 (determined in block 440) and the wear limit. For example, ECM 320 may calculate the amount of damage to piston pin bore 250 using the following equation:

$$D = X(i)/X_L \qquad \text{EQ. 4}$$

wherein:
- D is the amount of damage to piston pin bore 250,
- i is the current iteration (of the calculation of the current wear of piston bore),
- X(i) is the wear of piston pin bore 250 (or the current wear of piston pin bore 250), and
- $X_L$ is the wear limit.

In some implementations, the amount of damage to piston pin bore 250 may be expressed as a percentage (e.g., a percentage of the wear limit). For example, ECM 320 may determine a level (or a percentage) of damage to piston pin bore 250 based on the calculated damage and may take remedial action if the level of damage meets and/or exceeds a threshold (as will be described in more detail below). Additionally, or alternatively, ECM 320 may determine that piston pin bore 250 is completely damaged when the wear of piston pin bore 250 reaches the wear limit.

In some implementations, the various equations and associated elements, described herein, to determine the amount of damage to piston pin bore 250 may form a piston damage model. In some implementations, the piston damage model may be included in the piston pin bore wear information. In some implementations, the piston damage model may be used to determine an amount of wear of a piston skirt (e.g, skirt 220) and/or an amount of damage to the piston skirt based on the amount of wear of the piston skirt. The various equations are provided as example equations. In some implementations, the associated elements (and/or additional elements) may be used in different mathematical combinations and/or different equations to determine the amount of damage to a piston pin bore and/or the amount of wear of the piston skirt (e.g, skirt 220).

As further show in FIG. 4, process 400 may include determining whether the damage exceeds a threshold (block 460). For example, ECM 320 may determine whether the amount of damage to piston pin bore 250 (determined in block 450) exceeds a piston pin bore damage threshold. In some implementations, the piston pin bore damage threshold may correspond to an amount of wear that causes (or starts to cause) damage piston 200, the piston pin, connection rod, 190, and/or other components of piston 200 and/or engine 100. For example, the piston pin bore damage threshold may correspond to an amount of wear that causes (or starts to cause) excessive motion between piston 200 and connecting rod 190, which excessive motion may lead to seizure of the piston pin and scuffing of piston 200. In some implementations, the piston pin bore damage threshold may be included in the piston pin bore wear information. In some implementations, the piston pin bore damage threshold may be vary based on physical parameters of each piston pin bore.

As further shown in FIG. 4, if the damage exceeds the threshold (block 460—YES), then process 400 may include taking a remedial action (block 470). For example, if ECM 320 determines that the amount of damage to piston pin bore 250 (determined in block 450) exceeds the piston pin bore damage threshold, ECM 320 may take a remedial action. In some implementations, the remedial action may include causing information to be displayed via display 330. For example, the information may indicate that the amount of damage to piston pin bore 250 has exceeded the piston pin bore damage threshold and that piston 200 may be damaged and/or may fail if piston 200 continues to be used (or, in other words, if piston 200 is not replaced or serviced). Additionally, or alternatively, the information may indicate that engine 100 is to be shut down or derated to prevent additional wear and/or damage to piston pin bore 250, that engine 100 is to be serviced, that piston 200 is to be replaced or serviced, and/or the like. Additionally, or alternatively, the information may include instructions for servicing engine 100, instructions for servicing piston 200 (e.g., replacing and/or repairing piston 200), information identifying piston pin bore 250 and a location of piston pin bore 250 within engine 100 (for example, if engine 100 includes multiple pistons), and/or the like. In some implementations, the information may be transmitted to a remote location (e.g., a back office system) and/or another device. For example, ECM 320 may cause the information to be transmitted to the remote location and/or the other machine. In some implementations, the information may enable characteristics/attributes of a similar piston (e.g, properties, geometry, shape, etc.) to be modified during manufacture so as to reduce a wear rate of a piston pin bore during similar operating conditions.

Additionally, or alternatively, the remedial action may include causing service instructions to be provided. Additionally, or alternatively, the remedial action may include causing service of engine 100 and/or piston 200 to be automatically scheduled. Additionally, or alternatively, the remedial action may include may modify an operation of engine 100. For example, ECM 320 may cause engine 100 to slow down, decelerate, and/or be shut down to prevent additional damage to piston 200.

In some implementations, each remedial action described above may associated with a respective amount of wear of piston pin bore 250 (with each amount of wear corresponding to a respective level of severity of damage to piston pin bore 250, piston 200, and/or engine 100). Accordingly, ECM 320 may select a remedial action based on the amount of wear of piston pin bore 250.

As further shown in FIG. 4, if the damage count does not exceed the threshold (block 460—NO), then process 400 may return to block 410. In some implementations, if the damage count does not exceed the threshold (block 460—NO), then process 400 may return to any one of block 410, block 420, block 430, block 440, or block 450. In some implementations, with respect to block 420, the base piston pin bore wear rate may vary over period of time based on the wear of piston pin bore 250. Accordingly, as explained above, ECM 320 may re-determine the piston pin bore wear rate each time ECM 320 determines the wear of piston pin bore 250.

INDUSTRIAL APPLICABILITY

The disclosed system may be used in any application where an increase in reliability of an engine and components of an engine is desire. The disclosed system may increase engine reliability by monitoring and determining an amount of wear of a piston pin bore, determining an amount of damage to the piston pin bore based on the amount of wear, and taking a remedial action when the amount of damage exceeds a threshold. In some implementations, ECM 320 may determine the base piston pin bore wear rate, the effective piston pin bore wear rate, the amount of wear of piston pin bore 250, and/or the amount of damage to piston pin bore 250 in real-time or near real-time. In some implementations, ECM 320 may predict a time (e.g., date and/or time) when engine 100 and/or piston 200 may begin experiencing damage and/or when engine 100 and/or piston 200 may begin experience a failure based on one or more factors (e.g., the base piston pin bore wear rate, the effective piston pin bore wear rate, the amount of wear of piston pin bore 250, the amount of damage to piston pin bore 250, the time interval for ECM 320 to determine the amount of wear, the previous amount of wear, other information include in the piston pin bore wear information, and/or the like). In this regard, as part of taking the remedial action, ECM 320 may cause information regarding the prediction to be displayed via display 330, may cause information indicating that engine 100 and/or piston 200 are to be serviced and/or replaced at or before the predicted time to be displayed via display 330, may cause engine 100 and/or piston 200 to replaced, cause a service of engine 100 and/or piston 200 to be scheduled, and/or the like.

The disclosed system may have broad applicability. In particular, the system may be applicable to any type and design of piston 200, and may be useful during design and/or selection of piston 200 prior to use of piston 200 within engine 100. For example, information associated with and performance parameters measured from an existing engine may be used by ECM 320 to simulate wear of an engine and components of the engine. The results of the simulation may then be used to design and/or select application-specific pistons. In addition, the system may provide information regarding the amount of damage to piston pin bore 250, and the information may remain accurate as engine 100 wears (as the piston pin bore wear information is updated based on wear conditions). In addition, the system may be useful across multiple configurations or platforms of engines. In some implementations, wear of a piston pin (received by piston pin bore 250) may be determined based on the wear determined for piston pin bore 250. For example, an amount of wear of a piston pin bore may influence/affect an amount of wear of the piston pin (e.g., wear of grooves of the piston pin). In this regard, a relationship may exist between the wear of piston pin bores and the wear of the piston pin. Accordingly, ECM 320 may determine the wear of the piston bin based on a relationship between the wear of piston pin bores and the wear of the piston pin. In some implementations, the relationship may be determined based on additional experiments, field studies, analyses, and/or the like.

The disclosed concepts can be used during development of the engine components based on historic engine data, as desired. In particular, the disclosed concepts can be used to determine the status of the engine components given particular operating conditions. For example, based on a calculated amount of damage calculated for the engine components when exposed to the particular operating conditions, properties and/or geometry of the engine components can be changed so as to reduce the amount damage for the same components exposed to the same operating conditions.

It will be apparent to those skilled in the art that various modifications and variations can be made to the disclosed system. Other embodiments will be apparent to those skilled in the art from consideration of the specification and practice of the disclosed system. For example, it may be possible for engine 100 to not have cylinder liner 130, if desired, and for piston 200 to reciprocate directly within cylinder bores 120.

No element, act, or instruction used herein should be construed as critical or essential unless explicitly described as such. While the present disclosure has been referring to monitoring or determining wear of a piston bore of a piston of an engine, one skilled in the art would appreciate that the present disclosure may similarly apply to monitoring or determining wear of one or more other engine components (including one or more of the engine components of engine 100 described above). In this regard, any reference to engine 100 may refer to engine 100 as a whole and/or one or more components of engine 100. Similarly, any reference to piston 200 may refer to piston 200 as a whole and/or one or more components of piston 200. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A control system for monitoring an amount of wear of a piston pin bore of a piston of an engine, the control system comprising:
    a memory configured to store piston pin bore wear information; and
    an electronic control module configured to:
        obtain, from the piston pin bore wear information stored in the memory, information identifying a previous amount of wear of the piston pin bore and information identifying a wear limit;
        determine a base piston pin bore wear rate;
        calculate an effective piston pin bore wear rate based on the base piston pin bore wear rate;
        determine an amount of time between a current time and a time when the previous amount of wear of the piston pin bore was calculated;
        calculate a current amount of wear of the piston pin bore based on the previous amount of wear of the piston pin bore, the amount of time, and the effective piston pin bore wear rate;
        calculate an amount of damage to the piston pin bore based on the current amount of wear of the piston pin bore and the wear limit; and
        take a remedial action based on the amount of damage to the piston pin bore.

2. The control system of claim 1, wherein the electronic control module is further configured to determine whether the amount of damage to the piston pin bore exceeds a piston pin bore damage threshold.

3. The control system of claim 2, wherein the electronic control module is configured to take the remedial action when the amount of damage to the piston pin bore exceeds the piston pin bore damage threshold.

4. The control system of claim 1, wherein the electronic control module is configured to calculate the effective piston pin bore wear rate based on the base piston pin bore wear rate and a wear rate modifier.

5. The control system of claim 1, wherein the electronic control module is configured to determine the base piston pin bore wear rate based on a piston pin bore unit load.

6. The control system of claim 5, wherein the electronic control module is configured to determine the piston pin bore unit load based on a cylinder pressure of the engine, a speed of the engine, and a mass of the engine.

7. The control system of claim 1, further comprising a display,
    wherein, when taking the remedial action, the electronic control module is configured to cause information to be displayed via the display, and
    wherein the information, displayed to a user, includes:
        information indicating that the amount of damage to the piston pin bore has exceeded piston pin bore damage threshold and that the piston is to be damaged or is to fail if the piston continues to be used.

8. The control system of claim 1, further comprising a display,
    wherein, when taking the remedial action, the electronic control module is configured to cause information to be displayed via the display,
    wherein the information, displayed to a user, includes at least one of:
        information indicating that the engine is to be shut down or derated to prevent additional wear of the piston pin bore,
        information indicating that the engine is to be serviced, or
        information indicating that the piston is to be serviced or replaced.

9. The control system of claim 1, wherein, when taking the remedial action, the electronic control module is configured to modify an operation of the engine,
    wherein, when taking the remedial action, wherein, when modifying the operation of the engine, the electronic control module is configured to at least one of:
    cause the engine to decelerate, or
    cause the engine to shut down.

10. A method for monitoring an amount of wear of a piston pin bore of a piston of an engine, the method comprising:
    obtaining, by an electronic control module and from piston pin bore wear information stored in a memory, information identifying a previous amount of wear of the piston pin bore and information identifying a wear limit;
    determining, by the electronic control module, a base piston pin bore wear rate;
    calculating, by the electronic control module, an effective piston pin bore wear rate based on the base piston pin bore wear rate;

determining, by the electronic control module, an amount of time between a current time and a time when the previous amount of wear of the piston pin bore was calculated;

calculating, by the electronic control module, a current amount of wear of the piston pin bore based on the previous amount of wear of the piston pin bore, the amount of time, and the effective piston pin bore wear rate;

calculating, by the electronic control module, an amount of damage to the piston pin bore based on the current amount of wear of the piston pin bore and the wear limit; and taking, by the electronic control module, a remedial action based on the amount of damage to the piston pin bore.

11. The method of claim 10, further comprising determining whether the amount of damage to the piston pin bore exceeds a piston pin bore damage threshold.

12. The method of claim 11, further comprising taking the remedial action when the amount of damage to the piston pin bore exceeds the piston pin bore damage threshold.

13. The method of claim 10, further comprising calculating the effective piston pin bore wear rate based on the base piston pin bore wear rate and a wear rate modifier.

14. The method of claim 10, further comprising determining the base piston pin bore wear rate based on a piston pin bore unit load.

15. The method of claim 10, further comprising determining the piston pin bore unit load based on a cylinder pressure of the engine, a speed of the engine, and a mass of the engine.

16. The method of claim 10, wherein taking the remedial action includes causing information to be displayed to a user, wherein the information, displayed to the user, includes at least one of:
  information indicating that the amount of damage to the piston pin bore has exceeded a piston pin bore damage threshold and that the piston is to fail if the piston continues to be used,
  information indicating that the engine is to be shut down or derated to prevent additional damage to the piston pin bore,
  information indicating that the engine is to be serviced, or
  information indicating that the piston is to be serviced or replaced.

17. The method of claim 10, wherein taking the remedial action includes modifying an operation of the engine, and wherein modifying the operation of the engine includes at least one of:
  causing the engine to decelerate, or
  causing the engine to shut down.

18. A machine comprising:
a piston;
a memory configured to store piston pin bore wear information,
  the piston pin bore wear information including information identifying a previous amount of wear of the piston pin bore; and
an electronic control module configured to:
  obtain, from the piston pin bore wear information stored in the memory, information identifying a previous amount of wear of the piston pin bore and information identifying a wear limit;
  determine a base piston pin bore wear rate;
  calculate an effective piston pin bore wear rate based on the base piston pin bore wear rate;
  determine an amount of time between a current time and a time when the previous amount of wear of the piston pin bore was calculated;
  calculate a current amount of wear of the piston pin bore based on the previous amount of wear of the piston pin bore, the amount of time, and the effective piston pin bore wear rate;
  calculate an amount of damage to the piston pin bore based on the current amount of wear of the piston pin bore and the wear limit; and
  take a remedial action based on the amount of damage to the piston pin bore.

19. The machine of claim 18, wherein the electronic control module is further configured to determine whether the amount of damage to the piston pin bore exceeds a piston pin bore damage threshold, and
  wherein the electronic control module is configured to take the remedial action when the amount of damage to the piston pin bore exceeds the piston pin bore damage threshold.

20. The machine of claim 18, wherein, when taking the remedial action, the electronic control module is configured to at least one of:
  modify the operation of the engine, or
  cause information to be displayed via a display of the machine,
    wherein the information, displayed via the display, includes at least one of:
      information indicating that the amount of damage to the piston pin bore has exceeded the piston pin bore damage threshold,
      information indicating that the engine is to be shut down or derated,
      information indicating that the engine is to be serviced, or
      information indicating that the piston is to be serviced or replaced.

* * * * *